US010351655B2

(12) United States Patent
Honcoop et al.

(10) Patent No.: US 10,351,655 B2
(45) Date of Patent: Jul. 16, 2019

(54) POLYURETHANE DISPERSIONS

(71) Applicant: CRODA INTERNATIONAL PLC, Yorkshire (GB)

(72) Inventors: Wilhelmus Adrianus Jacobus Honcoop, Bergembacht (NL); Remco Benjamin Van Triet, Reeuwijk (NL); Angela Leonarda Maria Smits, Zeist (NL)

(73) Assignee: CRODA INTERNATIONAL PLC (GB)

( * ) Notice: Subject to any disclaimer, the term of this patent is extended or adjusted under 35 U.S.C. 154(b) by 0 days.

(21) Appl. No.: 15/117,980

(22) PCT Filed: Feb. 5, 2015

(86) PCT No.: PCT/GB2015/050309
§ 371 (c)(1),
(2) Date: Aug. 10, 2016

(87) PCT Pub. No.: WO2015/121621
PCT Pub. Date: Aug. 20, 2015

(65) Prior Publication Data
US 2017/0008997 A1 Jan. 12, 2017

(30) Foreign Application Priority Data

Feb. 14, 2014 (GB) .................................. 1402585.2

(51) Int. Cl.
| C08G 18/63 | (2006.01) |
| C08G 18/42 | (2006.01) |
| C08G 18/32 | (2006.01) |
| C08G 63/16 | (2006.01) |
| C08G 63/52 | (2006.01) |
| C08G 63/54 | (2006.01) |
| C08G 18/66 | (2006.01) |
| C08G 18/68 | (2006.01) |
| C08G 18/75 | (2006.01) |
| C08G 18/76 | (2006.01) |
| C08G 18/08 | (2006.01) |
| C09D 175/06 | (2006.01) |
| C08G 63/553 | (2006.01) |
| C08G 18/34 | (2006.01) |
| C08L 75/06 | (2006.01) |

(52) U.S. Cl.
CPC ..... *C08G 18/3206* (2013.01); *C08G 18/0823* (2013.01); *C08G 18/341* (2013.01); *C08G 18/4233* (2013.01); *C08G 18/4288* (2013.01); *C08G 18/664* (2013.01); *C08G 18/686* (2013.01); *C08G 18/755* (2013.01); *C08G 18/7671* (2013.01); *C08G 63/16* (2013.01); *C08G 63/52* (2013.01); *C08G 63/54* (2013.01); *C08G 63/553* (2013.01); *C08L 75/06* (2013.01); *C09D 175/06* (2013.01)

(58) Field of Classification Search
CPC ............ C08G 18/3206; C08G 18/0823; C08G 18/341; C08G 18/4233; C08G 18/4288; C08G 18/664; C08G 18/686; C08G 18/755; C08G 18/7671; C08G 63/16; C08G 63/54; C08G 63/52
See application file for complete search history.

(56) References Cited

U.S. PATENT DOCUMENTS

| 3,957,753 | A | | 5/1976 | Hostettler et al. |
| 4,430,131 | A | | 2/1984 | Tremblay |
| 4,602,079 | A | | 7/1986 | Vinches et al. |
| 4,791,168 | A | * | 12/1988 | Salatin ............... C08G 18/0823 427/407.1 |
| 5,326,815 | A | * | 7/1994 | Serdiuk .............. C08G 18/0823 524/539 |
| 6,372,875 | B1 | | 4/2002 | Mayer et al. |
| 8,067,479 | B2 | | 11/2011 | Cameron et al. |
| 9,512,262 | B2 | | 12/2016 | Erdem et al. |
| 2005/0143549 | A1 | | 6/2005 | Schijndel et al. |
| 2011/0071238 | A1 | * | 3/2011 | Bastioli ................ C08G 63/181 524/17 |

FOREIGN PATENT DOCUMENTS

| CN | 1633452 A | 6/2005 |
| CN | 1639220 A | 7/2005 |
| CN | 103483571 A | 1/2014 |
| EP | 2567996 A1 | 3/2013 |

(Continued)

OTHER PUBLICATIONS

International Search Report for PCT/GB2015/050309, dated Apr. 16, 2015, 2 Pages.
T. E. Breuer, 'Dimer Acids', in J. I. Kroschwitz (ed.), Kirk-Othmer Encyclopedia of Chemical Technology, 4th Ed., Wily, New York, 1993, vol. 8, pp. 223-237. Abstract only.
English language Written Opinion of the International Searching Authority for Application No. PCT/GB2015/050309, dated Aug. 14, 2016, 5 pages.
Chinese Office Action for Chinese Application No. 201580008309.8, dated Apr. 4, 2018, including English translation, 34 pages.
Liu, Y., "Brochure of Polyurethane Raw Materials and Auxiliaries," edited, Jan. 2013, pp. 147 and 267-269, Chemical Industry Press, 2nd Edition.

(Continued)

Primary Examiner — Michael L Leonard
(74) Attorney, Agent, or Firm — RatnerPrestia

(57) ABSTRACT

The present invention relates to a polyurethane dispersion comprising particles of a polyurethane dispersed in a dispersing medium, wherein the polyurethane is obtainable by reacting a polyol and an isocyanate, wherein the polyol comprises at least one dimer fatty residue selected from a dimer fatty diacid residue, a dimer fatty diol residue and a dimer fatty diamine residue; and at least one furan dicarboxylic acid residue. The invention also relates to a coating composition comprising the polyurethane dispersion, a polyol for making the polyurethane dispersion, the use of the polyol and a method of making the polyurethane.

23 Claims, No Drawings

(56) References Cited

FOREIGN PATENT DOCUMENTS

| | | | |
|---|---|---|---|
| GB | 1376353 | 12/1974 | |
| JP | H08511818 A | 12/1996 | |
| JP | 2002212273 A | 7/2002 | |
| JP | 2012522102 A | 9/2012 | |
| JP | 2013155388 A | 8/2013 | |
| WO | 2008067967 A2 | 6/2008 | |
| WO | WO-2008067967 A2 * | 6/2008 | ......... C08G 18/0823 |
| WO | 2011043660 A2 | 4/2011 | |
| WO | 2012005645 A1 | 1/2012 | |
| WO | 2012136521 A1 | 10/2012 | |
| WO | 2013034305 A1 | 3/2013 | |

OTHER PUBLICATIONS

Chinese Office Action for Chinese Application No. 2015800008309.8, dated Oct. 8, 2018, with translation, 30 pages.

* cited by examiner

POLYURETHANE DISPERSIONS

CROSS REFERENCE TO RELATED APPLICATIONS

This application is the National Stage filing of International Appln. No. PCT/GB2015/050309, filed 5 Feb. 2015, and claims priority of GB Application No. 1402585.2, filed 14 Feb. 2014, the entirety of which applications is incorporated herein by reference for all purposes.

The present invention relates to a polyurethane dispersion, a coating composition comprising the polyurethane dispersion, a polyol for making the polyurethane dispersion, the use of the polyol and a method of making the polyurethane.

Polyurethane dispersions are used in coating compositions, for example paints. Such coating compositions provide surface protective and/or decorative coatings which may be applied to substrates and allowed to dry or cure to form continuous protective and decorative films. Such coatings may be applied to a wide variety of substrates including metals, wood, plastics, and plaster. Important properties of the formed film include hardness and resistance to water.

Polyurethane dispersions are an important class of binders for aqueous coating compositions, as they produce excellent properties, such as chemical and stain resistance, hardness and toughness in the solid coating.

A polyurethane may be made by reacting a polyisocyanate with a polyol.

A polyurethane dispersion may be made by dispersing a polyurethane in a dispersing medium. The polyurethane may not be soluble or may be sparingly soluble in the dispersing medium. In other words, the polyurethane is not dissolved in the dispersing medium. The polyurethane dispersion comprises particles of polyurethane dispersed in the dispersing medium. The dispersing medium is a continuous phase and the particles of polyurethane are a discrete phase within the continuous phase.

A polyurethane dispersion may be based on a pre-polymer made by reacting a polyol with an excess molar amount of a polyisocyanate. The pre-polymer may be dispersed in a dispersing medium. The pre-polymer dispersion may then be reacted with a chain extender to form the final polyurethane dispersion.

The present invention seeks to provide an improved polyurethane dispersion and/or a polyol which may be used in making the polyurethane dispersion so that one or more properties (e.g. physical properties) of a coating formed from the polyurethane dispersion is improved. These improved properties may include one or more of hardness, chemical or hydrolysis resistance or an improvement in a combination of these properties.

The present invention is based in part on the recognition by the applicant that the use of a residue of a furan dicarboxylic acid (FDCA) in combination with a dimer fatty residue in a polyol may provide a coating formed from a polyurethane dispersion which comprises the polyol with improved properties which balance flexibility and chemical/hydrolysis resistance with increased hardness. Without being bound by theory, it is believed that the dimer fatty residue may provide the flexibility and hydrolysis resistance due to its amorphous and hydrophobic nature and the residue of a furan dicarboxylic acid may provide the hardness due to its crystalline or semi-crystalline nature.

Thus viewed from a first aspect, the present invention provides a polyurethane dispersion comprising particles of a polyurethane dispersed in a dispersing medium, wherein the polyurethane is obtainable by reacting a polyol and a polyisocyanate, wherein the polyol comprises:

a) at least one dimer fatty residue selected from a dimer fatty diacid residue, a dimer fatty diol residue and a dimer fatty diamine residue; and b) at least one furan dicarboxylic acid residue.

Viewed from a second aspect, the present invention provides a coating composition comprising a polyurethane dispersion of the first aspect.

Viewed from a third aspect, the present invention provides a polyol for use in making a polyurethane dispersion, wherein the polyol comprises:

a) at least one dimer fatty residue selected from a dimer fatty diacid residue, a dimer fatty diol residue and a dimer fatty diamine residue; and b) at least one residue of a furan dicarboxylic acid.

The polyol of the third aspect of the invention may include any of the features described herein with regard to the polyol described in connection with the polyurethane dispersion of the first aspect of the invention.

Viewed from a fourth aspect, the present invention provides a method of making a polyurethane dispersion comprising reacting a polyol of the third aspect with a polyisocyanate to form a polyurethane which is then dispersed in a dispersing medium to form the polyurethane dispersion.

Viewed from a fifth aspect, the present invention provides the use of a polyol of the third aspect of the invention to form a polyurethane.

The polyurethane dispersion of the invention may be a liquid dispersion. The polyurethane dispersion may be a true dispersion, i.e. where the polyurethane particles are stable to aggregation. The polyurethane particles in the polyurethane dispersion may be relatively uniformly dispersed and resistant to settling out on standing, but if some settling out does occur, the polyurethane particles may be easily redispersed by simple agitation.

It will be understood that any upper or lower quantity or range limit used herein may be independently combined.

It will be understood that, when describing the number of carbon atoms in a substituent group (e.g. 'C1 to C6'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

Many of the chemicals which may be used to produce the polyol or polyurethane of the present invention are obtained from natural sources. Such chemicals typically include a mixture of chemical species due to their natural origin. Due to the presence of such mixtures, various parameters defined herein can be an average value and may be non-integral.

The term 'polyol' is well known in the art, and refers to a molecule comprising more than one hydroxyl group. The term 'active hydrogen' refers to the hydrogen atoms present as part of the hydroxyl groups of the polyol.

The term 'polyester' as used herein refers to a molecule or group with more than one ester bond.

The term 'functionality' as used herein with regard to a molecule or part of a molecule refers to the number of functional groups in that molecule or part of a molecule. A 'functional group' refers to a group in a molecule which may take part in a chemical reaction. For example, a carboxylic acid group, a hydroxyl group and an amine group are all examples of functional groups. For example, a diacid (with two carboxylic acid groups) and a diol (with two hydroxyl groups) both have a functionality of 2 and a triacid and triol both have a functionality of 3.

The term 'dimer fatty residue' as used herein, unless otherwise defined, refers to a residue of a dimer fatty acid (also referred to as a dimer fatty diacid) or a residue of a dimer fatty diacid derivative such as a dimer fatty diol or a dimer fatty diamine.

The term 'dimer fatty acid' (also referred to as dimer fatty diacid) is well known in the art, and refers to the dimerisation products of mono- or polyunsaturated fatty acids and/or esters thereof. The related term trimer fatty acid similarly refers to trimerisation products of mono- or polyunsaturated fatty acids and/or esters thereof.

Dimer fatty acids are described in T. E. Breuer, 'Dimer Acids', in J. I. Kroschwitz (ed.), Kirk-Othmer Encyclopedia of Chemical Technology, 4th Ed., Wily, N.Y., 1993, Vol. 8, pp. 223-237. They are prepared by polymerising fatty acids under pressure, and then removing most of the unreacted fatty acid starting materials by distillation. The final product usually contains some small amounts of mono fatty acid and trimer fatty acids, but is mostly made up of dimer fatty acids. The resultant product can be prepared with various proportions of the different fatty acids as desired.

The ratio of dimer fatty acids to trimer fatty acids can be varied, by modifying the processing conditions and/or the unsaturated fatty acid feedstock. The dimer fatty acid may be isolated in substantially pure form from the product mixture, using purification techniques known in the art, or alternatively a mixture of dimer fatty acid and trimer fatty acid may be employed.

The dimer fatty acids or dimer fatty residues used in the present invention are preferably derived from the dimerisation products of C10 to C30 fatty acids, more preferably C12 to C24 fatty acids, particularly C14 to C22 fatty acids, further preferably C16 to C20 fatty acids, and especially C18 fatty acids. Thus, the resulting dimer fatty acids preferably comprise in the range from 20 to 60, more preferably 24 to 48, particularly 28 to 44, further preferably 32 to 40, and especially 36 carbon atoms.

The fatty acids, from which the dimer fatty acids are derived, may be selected from linear or branched unsaturated fatty acids. The unsaturated fatty acids may be selected from fatty acids having either a cis/trans configuration, and may have one or more than one unsaturated double bonds.

Preferably, the fatty acids used are linear monounsaturated fatty acids.

The dimer fatty acids may be hydrogenated. The dimer fatty acids may be non-hydrogenated. A hydrogenated dimer fatty residue (from a diacid, diol or diamine) may have better oxidative or thermal stability which may be desirable in a polyurethane formed from the co-polymer polyol.

Suitable dimer fatty acids are preferably derived from (i.e. are the dimer equivalents of) the dimerisation products of oleic acid, linoleic acid, linolenic acid, palmitoleic acid, or elaidic acid. In particular, suitable dimer fatty acids are derived from oleic acid.

The dimer fatty acids may be dimerisation products of unsaturated fatty acid mixtures obtained from the hydrolysis of natural fats and oils, e.g. sunflower oil, soybean oil, olive oil, rapeseed oil, cottonseed oil, or tall oil.

The molecular weight (weight average) of the dimer fatty acid is preferably in the range from 450 to 690, more preferably 500 to 640, particularly 530 to 610, and especially 550 to 590.

In addition to the dimer fatty acids, dimerisation usually results in varying amounts of trimer fatty acids (so-called "trimer"), oligomeric fatty acids, and residues of monomeric fatty acids (so-called "monomer"), or esters thereof, being present. The amount of monomer can, for example, be reduced by distillation.

Similarly, the optional trimer fatty acids are preferably derived from the trimerisation products of the materials mentioned with regard to the dimer fatty acids, and are preferably trimers of C10 to C30, more preferably C12 to C24, particularly C14 to C22, further preferably C16 to C20 fatty acids, and especially C18 fatty acids. Thus, the trimer fatty acids preferably contain in the range from 30 to 90, more preferably 36 to 72, particularly 42 to 66, further preferably 48 to 60, and especially 54 carbon atoms.

The molecular weight (weight average) of the trimer fatty triacids is preferably in the range from 750 to 950, more preferably 790 to 910, particularly 810 to 890, and especially 830 to 870.

In one embodiment of the present invention, tetramer fatty acids and higher oligomers (hereinafter both referred to as oligomeric acids) are formed during production of the dimer fatty acid. Such oligomeric acids may therefore also be present in the dimer fatty acids used in the present invention, in combination with trimer fatty acids and/or dimer fatty acids and/or mono fatty monoacids.

The oligomeric acids are preferably oligomers, containing 4 or more units derived from C10 to C30, more preferably C12 to C24, particularly C14 to C22, and especially C18 fatty acids. The molecular weight (weight average) of the oligomeric acid is suitably greater than 1,000, preferably in the range from 1,200 to 1,800, more preferably 1,300 to 1,700, particularly 1,400 to 1,600, and especially 1,400 to 1,550.

The dimer fatty acid used in the present invention preferably may have a dimer fatty acid (or dimer) content of greater than 60 wt. %, more preferably greater than 70 wt. %, particularly greater than 80 wt. %, and especially greater than 85 wt. %. Most preferably, the dimer content of the dimer fatty acid is in the range from 90 wt. % to 99 wt. %.

In an alternative embodiment, the dimer fatty acid preferably has a dimer fatty acid (or dimer) content in the range from 70 wt. % to 96 wt. %. This may be applicable in particular for two component or cross-linked systems.

In addition, particularly preferred dimer fatty acids may have a trimer fatty acid (or trimer) content of less than 40 wt. %, more preferably less than 30 wt. %, particularly less than 20 wt. %, and especially less than 15 wt. %. The trimer fatty acid content may be less than 1 wt. %.

Furthermore, the dimer fatty acid preferably comprises less than 10 wt. %, more preferably less than 6 wt. %, particularly less than 4 wt. %, and especially less than 3.5 wt. % of mono fatty monoacid (or monomer).

All of the above weight percentage values are based on the total weight of polymerised fatty acids and mono fatty acids present.

A dimer fatty diacid (or dimer fatty acid) may be converted to a dimer fatty diol as is known in the art. For example, a dimer fatty diol may be formed by hydrogenation of the corresponding dimer fatty acid. A dimer fatty diol may have properties as described herein with regard to a dimer fatty diacid (or dimer fatty acid) except that the acid groups in the dimer fatty diacid are replaced with hydroxyl groups in the dimer fatty diol. In a similar manner, a trimer fatty triacid may be converted to a trimer fatty triol which may have properties as described herein with regard to a trimer fatty triacid.

The dimer fatty diol may be hydrogenated. The dimer fatty diol may be non-hydrogenated.

A dimer fatty diacid (or dimer fatty acid) may be converted to a dimer fatty diamine as is known in the art. A dimer fatty diamine may have properties as described herein with regard to a dimer fatty diacid (or dimer fatty acid) except that the acid groups in the dimer fatty diacid are replaced with amine groups in the dimer fatty diamine. In a similar manner, a trimer fatty triacid may be converted to a trimer fatty triamine which may have properties as described herein with regard to a trimer fatty triacid.

The dimer fatty diamine may be hydrogenated. The dimer fatty diamine may be non-hydrogenated.

The polyurethane of the first aspect of the invention is obtainable by reacting a polyol and an isocyanate.

The polyol as described herein may be a polyol of the third aspect of the invention.

One of the components of the polyol is:
a) at least one dimer fatty residue selected from a dimer fatty diacid residue, a dimer fatty diol residue and a dimer fatty diamine residue.

The at least one dimer fatty residue may include any of the features or preferences described herein with regard to dimer fatty diacids, dimer fatty diols or dimer fatty diamines.

The at least one dimer fatty residue may be saturated or unsaturated. Preferably the at least one dimer fatty residue is saturated.

The dimer fatty residue is fatty in nature and this may increase the hydrophobicity of the polyol. The presence of the dimer fatty residue may make the polyol more amorphous, non-crystalline or substantially non-crystalline. The amorphousness may increase the flexibility of a coating formed from the polyurethane dispersion.

The polyol may comprise at least 20 wt % dimer fatty residue, preferably at least 30 wt %. The polyol may comprise at most 80 wt % dimer fatty residue, preferably at most 70 wt %. Preferably the polyol comprises at least 20 wt % and at most 80 wt % of the at least one dimer fatty residue.

The at least one dimer fatty residue may be selected from a dimer fatty diacid residue and a dimer fatty diamine residue.

The at least one dimer fatty residue may be a dimer fatty diacid residue.

The polyol may comprise at least 20 wt % dimer fatty diacid residue, preferably at least 30 wt %. The polyol may comprise at most 80 wt % dimer fatty diacid residue, preferably at most 70 wt %.

The polyol may not comprise a dimer fatty diol residue.

These amounts of dimer fatty residue may provide a suitable amount of hydrophobicity and/or amorphousness to the polyol to provide improved hydrolysis and/or chemical resistance in a coating formed from the polyurethane dispersion without an excessive decrease in the hardness of the coating.

One of the components of the polyol is:
b) at least one furan dicarboxylic acid residue.

The furan dicarboxylic acid used in making the polyol may be 2,3-, 3,4- or 2,5-furan dicarboxylic acid or mixtures thereof or a corresponding alkyl ester, such as a methyl and/or ethyl mono and/or diester, or a corresponding halide, such as a corresponding chloride, bromide and/or iodide. Preferably the furan dicarboxylic acid is 2,5-furan dicarboxylic acid. Preferably the furan dicarboxylic acid residue is derived from a furan dicarboxylic acid alkyl ester, more preferably a methyl ester, for example a methyl diester.

Preferably the at least one furan dicarboxylic acid residue is a 2,3-, 3,4- or 2,5-furan dicarboxylic acid residue or mixtures thereof. More preferably the at least one furan dicarboxylic acid residue is a 2,5-furan dicarboxylic acid residue.

Furan-based monomers such as 2,5-furan dicarboxylic acid are available under the trade name 'YXY' from Avantium. Alternatively, furan dicarboxylic acids can be made by the method disclosed in WO2011/043660.

The presence of the furan dicarboxylic acid residue in the polyol may make the polyol more crystalline. The increased crystallinity may increase hardness of a coating formed from a polyurethane dispersion formed from the polyol.

The polyol may comprise at least 1 wt % of the furan dicarboxylic acid residue, preferably at least 5 wt %, more preferably at least 8 wt %, even more preferably at least 10 wt %. The polyol may comprise at most 40 wt % of the furan dicarboxylic acid residue, preferably at most 30 wt %, more preferably at most 20 wt %, yet more preferably at most 15 wt %. Preferably the polyol comprises at least 5 wt % and at most 40 wt % of the at least one furan dicarboxylic acid residue.

These amounts of the furan dicarboxylic acid residue may provide a suitable amount of crystallinity to the polyol to provide improved hardness without an excessive decrease in flexibility of a coating formed from a polyurethane dispersion formed from the polyol.

If the polyol comprises at most 20 wt % of the furan dicarboxylic acid residue, this may cause the polyol to have improved processability when making a polyurethane dispersion when compared with a polyol which comprises more than 20 wt % of the furan dicarboxylic acid residue. The improved processability may be in the form of a reduced melting point temperature (Tm) of the polyol which may be advantageous when making a polyurethane dispersion.

The furan dicarboxylic acid residue is preferably derived from renewable and/or bio-based sources. The level of this may be determinable by ASTM D6866 as a standardised analytical method for determining the bio-based content of samples using $^{14}C$ radiocarbon dating. ASTM D6866 distinguishes carbon resulting from bio-based inputs from those derived from fossil-based inputs. Using this standard, a percentage of carbon from renewable sources can be calculated from the total carbon in the sample.

The furan dicarboxylic acid residue may have a renewable carbon content of at least 50 wt % when determined using ASTM D6866, preferably at least 65 wt %, more preferably at least 80 wt %.

The weight ratio of dimer fatty residue to furan dicarboxylic acid residue in the polyol may be at least 1:1, preferably at least 2:1, more preferably at least 3:1, even more preferably at least 4:1. The weight ratio of dimer fatty residue to furan dicarboxylic acid residue in the polyol may be at most 20:1, preferably at most 15:1, more preferably at most 10:1. Preferably the weight ratio of dimer fatty residue to furan dicarboxylic acid residue in the polyol is at least 4:1 and at most 20:1.

A lower weight ratio of dimer fatty residue to furan dicarboxylic acid residue in the polyol may cause the polyol to have an increased melting point temperature (Tm) due to the greater presence of the furan dicarboxylic acid residue.

A weight ratio of dimer fatty residue to furan dicarboxylic acid residue in the polyol of at least 4:1 may cause the polyol to have improved processability when making a polyurethane dispersion. The improved processability may be in the form of a reduced melting point temperature (Tm) of the polyol which may be advantageous when making a polyurethane dispersion.

The polyol may comprise at least one residue of a dicarboxylic acid which is not a dimer fatty diacid or a furan dicarboxylic acid (referred to herein as a non-dimeric, non-FDCA diacid)

The non-dimeric, non-FDCA diacid may be aliphatic or aromatic (such as phthalic acid, isophthalic acid and terephthalic acid), and include dicarboxylic acids and their esters, preferably alkyl esters, thereof.

The non-dimeric, non-FDCA diacid may be a linear dicarboxylic acid having a carbon chain in the range from 4 to 12 carbon atoms, such as adipic acid, glutaric acid, succinic acid, pimelic acid, suberic acid, azelaic acid, sebacic acid, heptane dicarboxylic acid, octane dicarboxylic acid, nonane dicarboxylic acid, decane dicarboxylic acid, undecane dicarboxylic acid, and dodecane dicarboxylic acid. Adipic acid is particularly preferred.

The polyol may comprise at least one residue of one or more diols which are not dimer fatty diols (referred to herein as non-dimeric diols). Preferably the non-dimeric diols have from 2 to 10 carbon atoms, more preferably from 5 to 8 carbon atoms.

Suitable non-dimeric diols may be independently selected from straight chain aliphatic diols or branched aliphatic diols, or a combination thereof.

Suitable non-dimeric diols include straight chain aliphatic diols such as ethylene glycol, diethylene glycol, 1,3-propylene glycol, dipropylene glycol, 1,4-butylene glycol, 1,6-hexylene glycol (also known as hexanediol) and mixtures thereof, branched diols such as neopentyl glycol, 3-methyl pentane glycol, 1,2-propylene glycol and mixtures thereof, and cyclic diols such as 1,4-bis(hydroxymethyl)cyclohexane and 1,4-cyclohexane-dimethanol and mixtures thereof.

Preferred straight chain aliphatic diols may be independently selected from ethylene glycol, diethylene glycol, 1,3-propylene glycol (better known as 1,3-propanediol), 1,4-butanediol, 1,6-hexanediol and mixtures thereof.

Preferred branched aliphatic diols may be independently selected from 1,2-propylene glycol, 1,2-butanediol, 2,3-butanediol, 1,3-butanediol, methylpropane diol and mixtures thereof.

The non-dimeric diol may be selected from hexanediol, neopentyl glycol, methylpropane diol, butanediol, diethyleneglycol and mixtures thereof.

Hexanediol is particularly preferred as a non-dimeric diol.

The polyol may comprise at least 10 wt % non-dimeric diol, preferably at least 20 wt %. The polyol may comprise at most 50 wt % non-dimeric diol, preferably at most 40 wt %, more preferably at most 30 wt %.

The polyol may further comprise:

c) at least one residue of a C2 to C10 diol.

The at least one residue of a C2 to C10 diol may be a non-dimeric diol as described herein. The polyol may comprise at least 10 wt % of a C2 to C10 diol, preferably at least 20 wt %. The polyol may comprise at most 50 wt % of a C2 to C10 diol, preferably at most 40 wt %, more preferably at most 30 wt %. Preferably the polyol comprises at least 10 wt % and at most 50 wt % of the at least one residue of a C2 to C10 diol.

The at least one residue of a C2 to C10 diol may be selected from hexanediol, neopentyl glycol, methylpropane diol, butanediol, diethyleneglycol and mixtures thereof.

The polyol may have a molecular weight (number average) of at least 500, preferably at least 800, more preferably at least 1000, even more preferably at least 1500, especially preferably at least 1800.

The polyol may have a molecular weight (number average) of at most 5000, preferably at most 4000, more preferably at most 3000, even more preferably at most 2500, especially preferably at most 2200.

Preferably the polyol has a number average molecular weight of at least 500 g/mol and at most 5000 g/mol.

The molecular weight (number average) may be determined by gel permeation chromatography or by end-group analysis. Preferably the molecular weight (number average) is determined by end-group analysis.

A higher molecular weight (number average) in the polyol may cause the polyol to have a higher viscosity at a predetermined temperature. A polyol with a molecular weight (number average) of at most 4000 may have improved processability when making a polyurethane for use in making a polyurethane dispersion when compared with a polyol with a number average molecular weight above 4000. This improved processability may be due to the lower viscosity at a predetermined temperature of the polyol with a molecular weight (number average) of at most 4000.

The polyol may have a glass transition temperature (Tg) of at most −30° C., preferably at most −40° C., more preferably less than −50° C. The polyol may have a glass transition temperature of at least −100° C., preferably at least −80° C., more preferably at least −60° C. Preferably the polyol has a glass transition (Tg) temperature of at least −100° C. and at most −30° C.

If the polyol has a glass transition temperature (Tg) of at least −100° C. and at most −30° C., this may cause a coating made from a polyurethane dispersion made from the polyol to have an improved balance of flexibility and hardness.

The glass transition temperature may be determined using DSC (differential scanning calorimetry). The DSC may be performed using a Mettler Toledo Instrument Module: DSC822.

The polyol may have a melting point temperature (Tm) of at most 125° C., preferably at most 100° C., more preferably at most 80° C. The polyol may have a melting point temperature (Tm) of at least −30° C., preferably at least −10° C., more preferably at least +10° C.

If the polyol has a melting point temperature (Tm) of at most 80° C., this may cause the polyol to have improved processability when making a polyurethane dispersion when compared with a polyol with a melting point higher than 80° C.

The melting point temperature (Tm) may be determined using DSC (differential scanning calorimetry). The DSC may be performed using a Mettler Toledo Instrument Module: DSC822.

The polyol may be formed by a condensation reaction. The polyol may be a polycondensate.

The polyol may comprise at least 2 ester bonds, preferably at least 3 ester bonds, more preferably at least 4 ester bonds, even more preferably at least 5 ester bonds.

The polyol may comprise at most 10 ester bonds, preferably at most 8 ester bonds, more preferably at most 7 ester bonds.

The polyol may be a polyester.

The polyol may comprise at least one ether bond. The polyol may be a polyesterether. Alternatively, the polyol may not comprise an ether bond.

The polyol may comprise at least one amide bond. The polyol may comprise at least one dimer fatty diamine residue. Alternatively, the polyol may not comprise an amide bond.

The polyol may be a polyesteramide. The polyol may be a polyesteretheramide.

The polyol is preferably formed from dicarboxylic acid to diol starting materials at a molar ratio in the range from 1:1 to 1:5, more preferably from 1:1.05 to 1:3, particularly preferably from 1:1.1 to 1:2, and especially preferably from 1:1.2 to 1:1.4. Thus, the amount of diol in the polyol is preferably present in molar excess so as to obtain a polyol terminated at both ends with hydroxyl groups. The polyol may comprise at least two hydroxyl end groups. The polyol may comprise two hydroxyl end groups.

The polyol preferably has a hydroxyl value (measured as described herein) in the range from 10 to 100, more preferably 30 to 90, particularly preferably 40 to 70, and especially preferably 50 to 60 mg KOH/g.

In addition, the polyol preferably has an acid value (measured as described herein) of less than 2, more preferably less than 1.7, particularly preferably less than 1.3, and especially preferably less than 1.0 mgKOH/g.

The polyol of the third aspect of the invention may include any of the features described herein with regard to the polyol described in connection with the polyurethane dispersion of the first aspect of the invention.

According to the first aspect of the invention, the present invention provides a polyurethane dispersion comprising particles of a polyurethane dispersed in a dispersing medium, wherein the polyurethane is obtainable by reacting a polyol and an isocyanate, wherein the polyol comprises:
  a) at least one dimer fatty residue selected from a dimer fatty diacid residue, a dimer fatty diol residue and a dimer fatty diamine residue; and
  b) at least one furan dicarboxylic acid residue.

According to the second aspect of the invention, the present invention provides a coating composition comprising a polyurethane dispersion of the first aspect. The coating composition may be an aqueous coating composition.

The polyurethane dispersion may be obtainable or obtained by dispersing the polyurethane in the dispersing medium to form the particles of the polyurethane dispersed in the dispersing medium. The polyurethane may not be soluble or may be sparingly soluble in the dispersing medium.

The dispersing medium may comprise water, preferably the dispersing medium comprises at least 50 wt % water, more preferably at least 75 wt % water, even more preferably at least 90 wt % water. The dispersing medium may comprise at most 100 wt % water, preferably at most 95 wt % water. Preferably the dispersing medium consists essentially of water, more preferably the dispersing medium is water. Preferably the polyurethane dispersion is an aqueous polyurethane dispersion.

The polyurethane dispersions may be used in many applications. Preferably the polyurethane dispersions are used in coating compositions.

Protective or decorative coating compositions prepared from a polyurethane dispersion according to the present invention can be formulated with a wide variety of ingredients well known to those skilled in the art of coating formulation, including solvents, fillers, pigments, pigment dispersing agents, rheology modifiers, thixotropes, flow and levelling aids, defoamers, etc.

Coating compositions of the present invention can be applied by any number of techniques including spray, brush, roller, paint mitt, and the like. Numerous substrates are suitable for application of coatings of this invention with proper surface preparation, as is well understood in the art. Such substrates include, but are not limited to metal, particularly steel and aluminium, concrete and plastics.

The coating compositions may be suitable for use as a primer coating on substrates such as concrete and steel. A preferred coating or overcoat layer to be used on top of a primer coating layer. Coatings of this invention can be applied and cured at ambient temperatures ranging from about 0° C. to about 50° C.

The polyurethane dispersions may comprise in the range from 10 wt. % to 80 wt. % polyurethane. Preferably, from 20 wt. % to 60 wt. % polyurethane. More preferably, from 30 wt. % to 50 wt. % polyurethane. The amount of polyurethane in the polyurethane dispersion may be indicative of the solids content of the dispersion. The polyurethane dispersions may comprise in the range from 10 wt. % to 80 wt. % solids. Preferably, from 20 wt. % to 60 wt. % solids. More preferably, from 25 wt. % to 50 wt. % solids.

The polyurethane may be obtained by reacting the polyol with an isocyanate. The isocyanate may be a polyisocyanate. The isocyanate may be a diisocyanate. The isocyanate is preferably at least one isocyanate which has a functionality of at least 2.

The isocyanate may be an aliphatic isocyanate, such as hexamethylene 1,6-diisocyanate or isophorone diisocyanate (IPDI). Alternatively, the isocyanate may be an aromatic isocyanate. Preferably, the isocyanate is an aliphatic isocyanate. An aliphatic isocyanate may be preferred for making a polyurethane dispersion for a coating because an aliphatic isocyanate may provide improved flexibility in the coating when compared with the rigidity provided by an aromatic isocyanate.

Suitable aromatic isocyanates may be selected from toluene diisocyanate, m-phenylene diisocyanate, p-phenylene diisocyanate, xylylene diisocyanate, 4,4'-diphenylmethane diisocyanate, polymethylenepolyphenyl diisocyanate, 3,3'-dimethyl-4,4'-biphenylene diisocyanate, 3,3'-dimethyl-4,4'-diphenylmethane diisocyanate, 3,3-dichloro-4,4'-biphenylene diisocyanate, 1,5-naphthalene diisocyanate, or modified compounds thereof such as uretonimine-modified compounds thereof.

The above isocyanate monomers may be used alone or as mixtures thereof.

The pre-polymer reaction mixture may preferably have an isocyanate content (measured as described herein) in the range from 5% to 30%, more preferably 15 to 23%, particularly 17% to 20%, and especially 18% to 19% NCO.

In one embodiment of the invention, at least one of the aforementioned isocyanates is reacted with the polyol of the first or third aspect, to form the pre-polymer.

The ratio of isocyanate to polyol starting materials which are mixed together to react to form the pre-polymer is preferably in the range from 20 to 80:20 to 80, more preferably 35 to 75:25 to 65, particularly 45 to 70:30 to 55, and especially 55 to 65:35 to 45 by weight.

The isocyanate is preferably used in molar excess relative to hydroxyl group content of the polyol, so as to obtain a reaction mixture containing isocyanate-terminated pre-polymer and sufficient unreacted isocyanate, such that later addition of the chain extender can result in reaction to form the polyurethane, without the requirement for adding further isocyanate.

In the polyurethane synthesis, the NCO/OH molar ratio employed is preferably in the range from 1 to 1.2:1, more preferably 1 to 1.1:1, and particularly 1 to 1.03:1.

The polyol and isocyanate may be reacted at an elevated temperature. Said elevated temperature may be in the range from 50° C. to 80° C. Preferably, in the range from 60° C. to 75° C.

A chain extender may optionally be present for forming the polyurethane dispersion. To obtain a dispersion with the desired properties, the molecular weight of the pre-polymer may be increased by using a chain extender. Preferred chain extenders may be selected from polyfunctional alcohols, polyfunctional amines, or carboxylic acid hydrazides. More preferably the chain extenders is a polyfunctional amine or a carboxylic acid hydrazides.

The chain extender suitably comprises a low molecular weight compound having two or more amine groups, for example aliphatic polyhydric amines such as ethylenediamine, hexamethylenediamine, and isophorone diamine; aromatic polyhydric amines such as methylene-bis(2-chloroaniline), methylenebis(dipropylaniline), diethyl-toluenediamine, trimethylene glycol di-p-aminobenzoate; alkanolamines such as diethanolamine, triethanolamine and diisopropanolamine.

In a preferred embodiment of the invention, the chain extender is a diamine, particularly having an aliphatic linear carbon chain comprising in the range from 1 to 10, and especially 3 to 5 carbon atoms.

The molar ratio of chain extender to polyol of the first or third aspect of the invention employed is preferably in the range from 1 to 10:1, more preferably 1.5 to 8:1, particularly 2 to 5:1, and especially 2.5 to 4:1.

In the present invention, the polyurethane composition may optionally contain other additives such as, urethane promoting catalysts, pigments, fillers, surfactants, and stabilisers.

Examples of urethane catalysts include tertiary amines such as triethylamine, 1,4-diazabicyclo[2.2.2.]octane (DABCO), N-methylmorpholine, N-ethylmorpholine, N,N,N',N'-tetramethylhexamethylenediamine, 1,2-dimethylimidazol; and tin compounds such as tin(II)acetate, tin(II) octanoate, tin(II)laurate, dibutyltin dilaurate, dibutyltin dimaleate, dioctyltin diacetate and dibutyltin dichloride. The catalysts may be used alone or as mixtures thereof.

Suitable surfactants include silicone surfactants such as dimethylpolysiloxane, polyoxyalkylene polyol-modified dimethylpolysiloxane and alkylene glycol-modified dimethylpolysiloxane; and anionic surfactants such as fatty acid salts, sulphuric acid ester salts, phosphoric acid ester salts and sulphonates.

Examples of the stabilisers include hindered phenol radical scavengers such as dibutylhydroxytoluene, pentaerythrityl-tetrakis[3-(3,5-di-t-butyl-4-hydroxyphenyl) propionate] and isooctyl-3-(3,5-di-t-butyl-4-hydroxyphenyl) propionate; antioxidants such as phosphorous acid compounds such as triphenylphosphite, triethylphosphite and triphenylphosphine; ultraviolet absorbing agents such as 2-(5-methyl-2-hydroxyphenyl)benzotriazole and a condensation product of methyl-3-[3-t-butyl-5-(2H-benzotriazole-2-yl)-4-hydroxyphenyl]propionate and polyethylene glycol.

Suitable pigments include inorganic pigments such as transition metal salts; organic pigments such as azo compounds; and carbon powder. Suitable fillers include inorganic fillers such as clay, chalk, and silica.

The dimer fatty residue content of the polyurethane used to make the polyurethane dispersion is preferably in the range from 5 to 50%, more preferably 8 to 40%, particularly 12 to 30%, and especially 15 to 20% by weight.

The polyurethane dispersion is preferably derived from renewable and/or bio-based sources. The level of this may be determinable by ASTM D6866 as described herein.

Preferably, the polyurethane dispersion has a renewable carbon content of at least 50% when determined using ASTM D6866. More preferably, at least 65%. Most preferably, at least 80%.

It has been found that use of known polyester polyols may make a polyurethane dispersion susceptible to hydrolysis, or degradation by UV/thermo-oxidation. These shortcomings limit the application possibilities of conventional polyurethane dispersions. Polyurethane dispersions according to the first aspect of the present invention are found to have good thermo-oxidative and UV stability. Additionally, said polyurethane dispersions may have good thermal stability, and good hydrolytic stability thereby offering resistance against attack by acids, alkalis, and alcohols.

The polyurethane particles in the dispersion may have an average particle size of 40 nm to 200 nm, preferably 50 nm to 150 nm, more preferably 60 nm to 120 nm when measured by laser correlation spectroscopy using a Malvern Autosizer II from Malvern Instruments Limited. The particle size is determined by dynamic light scattering to obtain an average particle volume measurement which is then converted to a linear particle size assuming spherical particles. Therefore the average particle size is an effective average particle diameter.

The hardness of a coating formed from the polyurethane dispersion may indicate the resistance of the coating to a mechanical force such as pressure, rubbing or scratching. The hardness of a coating composition may be measured by the König hardness. A coating composition comprising the polyurethane dispersion may have a König hardness of at least 40 s, preferably at least 45 s, more preferably at least 50 s, even more preferably at least 55 s when measured according to DIN ISO 2815. A coating composition comprising the polyurethane dispersion may have a König hardness of at most 100 s, preferably at most 80 s, when measured according to DIN ISO 2815.

The coating composition may dry at room temperature when applied to a substrate. The coating composition may not undergo a curing reaction to form the coating.

All of the features described herein may be combined with any of the above aspects, in any combination.

EXAMPLES

The present invention will now be described further by way of example only with reference to the following Examples. All parts and percentages are given by weight unless otherwise stated.

It will be understood that all tests and physical properties listed have been determined at atmospheric pressure and room temperature (i.e. about 20° C.), unless otherwise stated herein, or unless otherwise stated in the referenced test methods and procedures.

Tests of polyurethane dispersions in coatings were performed at 23° C. with a relative humidity of 50%.

Compounds as used in the following examples are identified as follows:

- 1,4-butanediol (BDO)—a bio-based version is available from BioAmber
- 1,6-hexanediol (HDO)
- Adipic acid ($C_6$ dicarboxylic acid)—a bio-based version is available from Verdezyne
- 2,5-furan dicarboxylic acid (FDCA)—available under the trade name 'YXY' from Avantium
- PRIPOL 1006 (TM) dimer fatty diacid—hydrogenated $C_{36}$ dimer dicarboxylic acid ex Croda
- Dimethylolpropionic acid (DMPA)
- Isophorone diisocyanate (IPDI)
- N-methyl pyrrolidone (NMP)
- Ethylene diamine (EDA)
- Triethylamine (TEA)

Test methods used in the following examples are as follows:

Number average molecular weight was determined by end group analysis with reference to the hydroxyl value.

Weight average molecular weight was determined by end group analysis with reference to the hydroxyl value.

The hydroxyl value is defined as the number of mg of potassium hydroxide equivalent to the hydroxyl content of 1 g of sample, and was measured by acetylation followed by hydrolysation of excess acetic anhydride. The acetic acid formed was subsequently titrated with an ethanolic potassium hydroxide solution.

The acid value is defined as the number of mg of potassium hydroxide required to neutralise the free fatty acids in 1 g of sample, and was measured by direct titration with a standard potassium hydroxide solution.

The isocyanate (NCO) value or content is defined as the weight % content of isocyanate in the sample and was determined by reacting with excess dibutylamine, and back titrating with hydrochloric acid.

Comparative Example P1: Formation of Polyol 1 (a FDCA Based Polyol)

This is a comparative example not according to the present invention. 100 parts by weight of 2,5-furan dicarboxylic acid and 106 parts by weight hexanediol were charged to a reactor equipped with a stirrer, a thermometer, a gas inlet and a condenser. In addition 0.1% by weight of stannous octoate as catalyst was added to the reactor. The temperature in the reactor was raised to 220-230° C. under normal pressure in a nitrogen atmosphere. An esterification reaction was conducted under these conditions until the desired acid and hydroxyl value were obtained. The evaluation results of the obtained polyester polyol gave an acid value of less than 1 mg KOH/g and a hydroxyl value of 56 mg KOH/g, equivalent to an number average molecular weight of about 2000 g/mol.

Examples P2 to P5: Formation of Polyols 2 to 5 (FDCA/Dimer Based Polyols)

Polyols 2 to 5 were made using the following general method. The specific amounts of A—PRIPOL 1006, B—2,5-furan dicarboxylic acid and C—hexanediol used to make Polyols 2 to 5 are given in Table 1 below.

General Method for Examples P2 to P5

A parts by weight PRIPOL 1006 and C parts by weight hexanediol were charged to a reactor equipped with a stirrer, a thermometer, a gas inlet and a condenser. The temperature in the reactor was raised to 180° C. under normal pressure in a nitrogen atmosphere. An esterification reaction was conducted under these conditions until a 50% reduction of the initial acid value was achieved. The temperature was then lowered to 160° C. where upon B parts weight 2,5-furan dicarboxylic acid and 0.1% by weight of stannous octoate as catalyst were added to the reactor. The temperature was raised to 220-230° C. under normal pressure in a nitrogen atmosphere. Under these conditions the esterification reaction was conducted until the desired acid and hydroxyl value were obtained. The evaluation results of the obtained polyols 2 to 5 gave an acid value of less than 1 mg KOH/g and a hydroxyl value of 56 mg KOH/g, equivalent to an number average molecular weight of about 2000 g/mol.

TABLE 1

Parts by Weight of components A to C in Polyols 1 to 5

| Polyol | Weight ratio A/B (A:B) | A - PRIPOL 1006 parts by weight | B - FDCA parts by weight | C - hexanediol parts by weight |
|---|---|---|---|---|
| 1 | 0/100 | — | 100 | 106 |
| 2 | 50/50 (1:1) | 100 | 100 | 113.2 |
| 3 | 70/30 (2.33:1) | 100 | 42.8 | 64.5 |
| 4 | 80/20 (4:1) | 100 | 25 | 49.3 |
| 5 | 90/10 (9:1) | 100 | 11.1 | 37.4 |

Comparative Example P6: Formation of Polyol 6 (a Dimer Based Polyol)

This is a comparative example not according to the present invention. 100 parts by weight PRIPOL 1006 and 28 parts by weight hexanediol were charged to a reactor equipped with stirrer, a thermometer, a gas inlet and condenser. In addition 0.1% by weight of stannous octoate as catalyst was added. The temperature in the reactor was raised to 220-230° C. under normal pressure in a nitrogen atmosphere. An esterification reaction was conducted under these conditions until the desired acid and hydroxyl value were obtained. The evaluation results of the obtained polyester polyol gave an acid value <1 mg KOH/g and a hydroxyl value of 56 mg KOH/g, equivalent to an number average molecular weight of about 2000 g/mol Comparative Example P7: Formation of Polyol 7 (a Dimer/Adipic Based Polyol)

This is a comparative example not according to the present invention. 100 parts by weight PRIPOL 1006, 11.1 parts by weight adipic acid and 38 parts by weight hexanediol, were charged to a reactor equipped with stirrer, a thermometer, a gas inlet and condenser. In addition 0.1% by weight of stannous octoate as catalyst was added. The temperature in the reactor was raised to 220-230° C. under normal pressure in a nitrogen atmosphere. An esterification reaction was conducted under these conditions until the desired acid and hydroxyl value were obtained. The evaluation results of the obtained polyester polyol gave an acid value <1 mg KOH/g and a hydroxyl value of 56 mg KOH/g, equivalent to an number average molecular weight of about 2000 g/mol.

Example T1: Thermographic Analysis of the Polyols 1 to 6

A thermographic analysis of the Polyols 1 to 6 was performed to determine glass transition temperature (Tg) and melting point (Tm) of the polyols. The analysis was performed using DSC (differential scanning calorimetry) with the following method and instrument settings.

Instrument:
Module: DSC822 (Name: DSC822-LT)
Manufacturer: Mettler Toledo
Method 1: −150(10) . . . 200(2×)/20 N2=30
Temperature program:
Isotherm Segment 1:10 min at −150° C.
Dynamic Segment 2:
  Start temperature: −150° C.
  End temperature: 200° C.
  Heating rate: 20° C./min Isotherm Segment 3: 1 min at 200° C.
Dynamic Segment 4:
  Start temperature: 200° C.
  End temperature: −150° C.
  Heating rate: −20° C./min
Isotherm Segment 5: 10 min at −150° C.
Dynamic Segment 6:
  Start temperature: −150° C.
  End temperature: 200° C.
  Heating rate: 20° C./min
Method 2: −100(10) . . . 200(2×)/10 N2=30
Temperature program:
Isotherm Segment 1: 10 min at −100° C.
Dynamic Segment 2:
  Start temperature: −100° C.
  End temperature: 200° C.
  Heating rate: 10° C./min
Isotherm Segment 3: 1 min at 200° C.
Dynamic Segment 4:
  Start temperature: 200° C.
  End temperature: −100° C.
  Heating rate: −10° C./min
Isotherm Segment 5:10 min at −100° C.
Dynamic Segment 6:
  Start temperature: −100° C.
  End temperature: 200° C.
  Heating rate: 10° C./min
Atmosphere:
Purge gas: N2
Flow rate: 30 ml/min
Sample:
Size: ~15 mg
Pan: 40 μl Aluminium crucible with automatic pierceable lid An average of the results from Method 1 and Method 2 was obtained for each polyol and the average results of the Differential Scanning calorimetry analysis are given in Table 2 below.

TABLE 2

Results of Differential Scanning Calorimetry

| Polyol | Tg (° C.) | Tm (° C.) | Physical form at room temperature |
|---|---|---|---|
| 1 | 13 | 144 | White solid |
| 2 | −41 | 121 | White solid |
| 3 | −48 | 96 | White solid/waxy |
| 4 | −52 | 69 | Waxy |
| 5 | −56 | 35 | Semi-transparent/liquid |
| 6 | −51 | 2 | Liquid |

Tg: glass transition
Tm: melting point

Examples PUD 5 and 7: Formation of Polyurethane Dispersions from Polyols 5 and 7

Test Methods for Polyurethane Dispersions:
Average particle size of the polyurethane particles in dispersion was measured by laser correlation spectroscopy using a Malvern Autosizer II from Malvern Instruments Limited. The particle size is determined using a dynamic light scattering mode to obtain an average particle volume measurement which is then converted to a linear particle size assuming spherical particles. Therefore the average particle size is an effective average particle diameter.

König hardness was tested using DIN ISO 2815
Chemical resistance was evaluated according to DIN12720:1997-10 in which coating samples were spot tested for a predetermined time and given a rating from 0=undamaged to 5=complete damage Synthesis of the Polyurethane Dispersions PUD5 and PUD7

Polyurethane dispersion (PUD) synthesis of PUD5 and PUD7 was performed using the acetone process.

Ingredients:

| | |
|---|---|
| 150 g | Polyol P5 or P7 |
| 12 g | Dimethylolpropionic acid (DMPA) |
| 56.3 g | Isophorone diisocyanate (IPDI)) |
| 27.8 g | N-methyl pyrrolidone (NMP) |
| 386 g | water |
| 3.4 g | Ethylene diamine (EDA) |
| 9.0 g | Triethylamine (TEA) |

The polyester polyol P5 or P7, DMPA and NMP (solvent) are dried at 120° C. under nitrogen. After cooling to 70° C., DBTL catalyst (0.05% wt on pre-polymer) and slowly IPDI (aliphatic diisocyanate) are added to the reaction until the desired NCO % has been reached. Then at 60° C. TEA is added for neutralising the DMPA carboxylic acid groups, during 0.5 to 1 hour, followed by cooling to 40-55° C. Then the prepolymer is diluted with acetone. At 30-40° C. the prepolymer is chain extended with EDA, added drop-wise and reacted 2 hours. The demineralised water is adding slowly during 1 hour and dispersed under vigorous stirring. Result is a 35% solids polyurethane dispersion (PUD) in water as a dispersing medium. Acetone can be used as processing aid, to reduce viscosity, and distilled off from the final PUD.

Formation of Coatings from PUD5 and PUD7

Glass was used as a substrate on which 100 μm films of the above described dispersions PUD5 and PUD7 were applied with the aid of an applicator frame (BYK PA-2030). The applied films were dried for 24 hours under ambient conditions to form a coating. The coatings thus formed from PUD5 and PUD7 were tested for König hardness and chemical resistance as described above. The results are given in Table 3 below.

TABLE 3

Physical properties of PUDs 5 and 7 and coatings formed from PUDs 5 and 7

| | PUD5 from Polyol 5 | PUD7 from Polyol 7 (comparative) |
|---|---|---|
| Proportion of total dispersion weight which is solid particles (wt % of solids) | 35 | 36 |
| Average particle size (nm) | 89 | 139 |
| König hardness (s) | 56 | 35 |
| Chemical resistance to: | | |
| Ammonia (10% soln) after 2 min | 2 | 4 |
| EtOH (50% soln) after 1 hour | 2 | 2 |
| Water after 16 hours | 1 | 5 |
| Acetic acid after 1 hour | 2 | 2 |

It can be seen from the results in Table 3 that the polyurethane dispersion PUD5 made from the FDCA/Dimer acid based Polyol 5 forms a coating with an improved König hardness over the polyurethane dispersion PUD7 made from the adipic acid/Dimer acid based comparative Polyol 7. Furthermore the overall resistance to the tested chemicals is higher for PUD5 than for PUD7 because PUD5 has lower damage ratings (0=undamaged and 5=complete damage).

The results in Table 3 demonstrate the improved properties provided to a coating composition formed from a polyurethane dispersion according to the present invention.

It is to be understood that the invention is not to be limited to the details of the above embodiments, which are described by way of example only. Many variations are possible.

The invention claimed is:

1. A polyurethane dispersion comprising particles of a polyurethane dispersed in a dispersing medium, wherein the polyurethane is obtainable by reacting a polyol and an isocyanate, wherein the polyol comprises:
    a) at least one dimer fatty diacid residue;
    b) at least one furan dicarboxylic acid residue; and
    c) at least 10 wt % of at least one residue of a $C_2$ to $C_{10}$ diol;
    wherein the weight ratio of dimer fatty diacid residue to furan dicarboxylic acid residue in the polyol is at least 1:1 and at most 20:1,
    wherein the polyol does not comprise a dimer fatty diol residue.

2. A polyurethane dispersion as claimed in claim 1 wherein the polyol comprises at least 20 wt % and at most 80 wt % of the at least one dimer fatty diacid residue.

3. A polyurethane dispersion as claimed in claim 1 wherein the polyol comprises at least 5 wt % and at most 40 wt % of the at least one furan dicarboxylic acid residue.

4. A polyurethane dispersion as claimed in claim 1 wherein the polyol has a number average molecular weight of at least 500 and at most 5000.

5. A polyurethane dispersion as claimed in claim 1 wherein the polyol has a glass transition (Tg) temperature of at least −100° C. and at most −30° C.

6. A polyurethane dispersion as claimed in claim 1 wherein the polyol has a melting point (Tm) temperature of at most 80° C.

7. A polyurethane dispersion as claimed in claim 1 wherein the polyol comprises at least 10 wt % and at most 50 wt % of the at least one residue of a $C_2$ to $C_{10}$ diol.

8. A polyurethane dispersion as claimed in claim 1 wherein the polyurethane dispersion is an aqueous polyurethane dispersion and the dispersing medium comprises water.

9. A coating composition comprising a polyurethane dispersion as claimed in claim 1.

10. A coating composition as claimed in claim 9 wherein the coating composition has a König hardness of at least 40 s when measured according to DIN ISO 2815.

11. A coating composition as claimed in claim 9 wherein the coating composition dries at room temperature when applied to a substrate and does not undergo a curing reaction.

12. A polyol, wherein the polyol comprises:
    a) at least one dimer fatty diacid residue;
    b) at least one furan dicarboxylic acid residue; and
    c) at least 10 wt % of at least one residue of a $C_2$ to $C_{10}$ diol;
    wherein the weight ratio of dimer fatty diacid residue to furan dicarboxylic acid residue in the polyol is at least 4:1 and at most 20:1, and
    wherein the polyol does not comprise a dimer fatty diol residue.

13. A polyol as claimed in claim 12 wherein the polyol has a number average molecular weight of at least 500 and at most 5000.

14. A polyol as claimed in claim 12 wherein the polyol has a glass transition (Tg) temperature of at least −100° C. and at most −30° C.

15. A method of making a polyurethane dispersion comprising reacting a polyol as claimed in claim 12 with an isocyanate to form a polyurethane which is then dispersed in a dispersing medium to form the polyurethane dispersion.

16. The polyurethane dispersion as claimed in claim 1 wherein the weight ratio of dimer fatty diacid residue to furan dicarboxylic acid residue in the polyol is at least 4:1 and at most 20:1.

17. The polyurethane dispersion as claimed in claim 1 wherein the $C_2$ to $C_{10}$ diol comprises at least one member selected from the group consisting of hexanediol, neopentyl glycol, methylpropane diol, butanediol and diethyleneglycol.

18. The polyurethane dispersion as claimed in claim 1 wherein the $C_2$ to $C_{10}$ diol comprises at least one of 1,4-butanediol or 1,6-hexanediol.

19. The polyurethane dispersion as claimed in claim 1 wherein the average particle size of the particles of the polyurethane is from 40 nm to 200 nm when measured by laser correlation spectroscopy.

20. The polyol as claimed in claim 12, wherein the $C_2$ to $C_{10}$ diol comprises at least one member selected from the group consisting of hexanediol, neopentyl glycol, methylpropane diol, butanediol and diethyleneglycol.

21. The polyol as claimed in claim 12 wherein the $C_2$ to $C_{10}$ diol comprises at least one of 1,4-butanediol or 1,6-hexanediol.

22. The polyol as claimed in claim 12 which has a melting point (Tm) temperature of at most 80° C.

23. The polyol as claimed in claim 12 which comprises at least 10 wt % and at most 50 wt % of the at least one residue of a $C_2$ to $C_{10}$ diol.

* * * * *